UNITED STATES PATENT OFFICE.

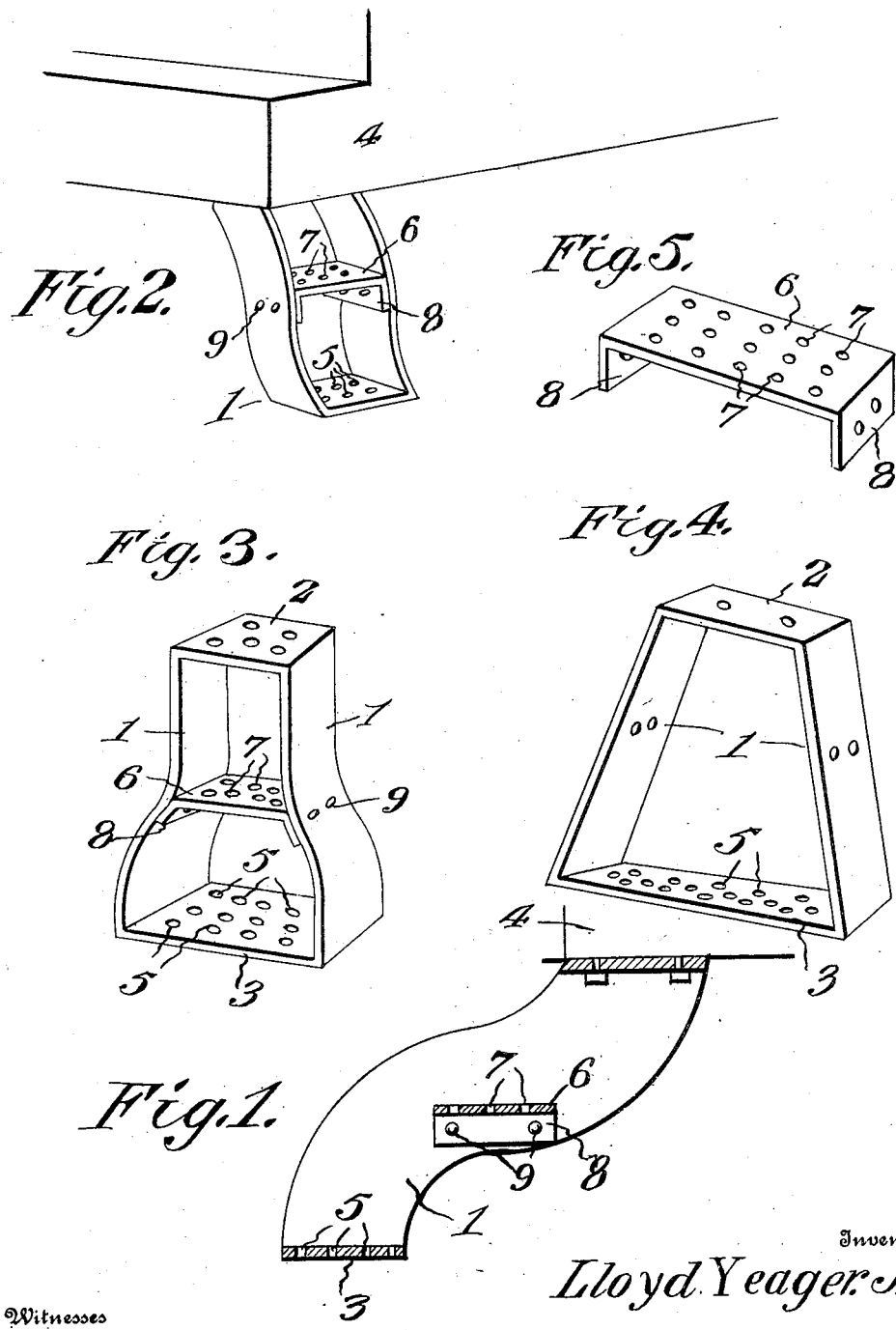

LLOYD YEAGER, JR., OF CATAWISSA, PENNSYLVANIA.

CAR-STEP.

No. 917,511.　　　　Specification of Letters Patent.　　　　Patented April 6, 1909.

Application filed April 29, 1908. Serial No. 429,925.

*To all whom it may concern:*

Be it known that I, LLOYD YEAGER, Jr., a citizen of the United States, residing at Catawissa, in the county of Columbia and State of Pennsylvania, have invented new and useful Improvements in Car-Steps, of which the following is a specification.

This invention relates to car steps, more particularly designed for use on freight cars, but capable of use in other relations.

One of the objects of the invention is to provide a car step for use by brakemen and others on cars which will reduce the chances of accidents in boarding the cars.

With this and other objects in view the invention resides in constructing a car step of a single casting having a foraminous lower tread portion and a separable foraminous step portion, said step portion having depending flanges upon its ends adapted to be connected to and serve as a brace for the sides of the main casting, the step and tread portions being positioned out of a line with each other, so that rain or snow collecting upon either the step or tread will percolate through the openings of the step portion without contacting the tread portion of the step, and the rain or snow directed upon the tread portion will have ready access to the ground below the step, thus obviating the liability of accidents from wet or slippery treads upon the car step.

With these and other objects in view the invention resides in the novel construction of car steps, hereinafter fully described and claimed.

In the accompanying drawings, Figure 1 is a central longitudinal sectional view of a car step constructed in accordance with the present invention. Fig. 2 is a perspective view of a modified form of the invention. Figs. 3 and 4 illustrate still further modifications. Fig. 5 is a detail perspective view of the intermediate, removable, tread.

As illustrated in the accompanying drawings the improved car step is constructed of a single casting of suitable material. The casting comprises sides 1, top 2 and treads 3. The top 2 of the step is provided with a plurality of openings adapted for the reception of retaining elements by which the step is secured upon the car 4. The sides 1 are adapted to extend away from the top 2 at a suitable curvature and inclination, and the integrally formed horizontal tread portion 3 is provided with a plurality of perforations or openings 5. These openings 5 are adapted to provide means whereby rain or snow accumulated upon the tread 3 may have ready access to the road bed over which the car 4 passes. The sides 1 are adapted to be provided with an intermediate tread or step member 6. This member 6 has its body portion provided with a plurality of openings 7, and has its sides bent at an angle to the body to provide the perforated ears 8, which are adapted to be positioned between the sides 1 of the step and to have their perforations aline with suitable openings provided by the sides 1, and these openings are adapted for the reception of securing elements 9, by which the tread 6 is retained in position upon the sides of the step.

It is to be noted that the step or tread 6 is positioned upon the sides 1 to the rear of the tread 3, so that snow or rain accumulating upon the tread 6 may percolate through the openings 7 without contacting the tread 3. By this arrangement it will be noted that water or slush upon the tread 6 may have a free passage to the road bed of the track without in any way interfering with the tread 3 positioned immediately below it. The top wall 2 of the step may be also positioned behind the path of the tread 6, as clearly illustrated in Fig. 1 of the drawings.

By arranging the step 6 as above described, and connecting it with the sides 1 of the car step, it will be seen that the step or tread provides an efficient brace or support for the sides of the car step and renders the structure strong and rigid.

Having thus fully described the invention what is claimed as new is:

1. A car step formed of an endless casting comprising a frame having a top, bottom and connecting sides, the bottom being provided with a plurality of openings, and a separable foraminous intermediate tread portion having depending ends adapted to be connected with and serve as a brace for the sides of the step.

2. A car step formed of a frame member comprising top, sides and a foraminous bottom tread portion, the top being provided with openings adapted for the reception of retaining elements by which the device is connected upon a car, and a foraminous intermediate tread portion having depending offsets adapted to be connected with the sides of the step and serve as a brace for the step, the intermediate tread being positioned behind the integrally formed bottom tread portion of the frame and having its rear edge forward of the top portion of the frame.

In testimony whereof I affix my signature in presence of two witnesses.

LLOYD YEAGER, JR.

Witnesses:
L. C. MENSCH,
L. W. WINTERSTEEN.